United States Patent [19]
Weetall

[11] 3,716,456
[45] Feb. 13, 1973

[54] ANION MONITORING SYSTEM
[75] Inventor: Howard H. Weetall, Elmira, N.Y.
[73] Assignee: Corning Glass Works
[22] Filed: May 14, 1971
[21] Appl. No.: 143,502

[52] U.S. Cl. ............................. 195/103.5 R, 195/127
[51] Int. Cl. ................................................ C12k 1/04
[58] Field of Search ............................ 195/103.5 R

[56] References Cited
OTHER PUBLICATIONS

H. Weetall, Nature, Vol. 223, No. 2, pp. 959–960; (1969).

Primary Examiner—A. Louis Monacell
Assistant Examiner—Robert J. Warden
Attorney—Clarence R. Patty, Jr.

[57] ABSTRACT

Continuous-flow monitoring system for determining the concentration of anions in an aqueous solution. The system is based on the inhibition by the anion of the enzymatic hydrolysis of an ester of the anion. Specific methods for determining the concentrations of inorganic phosphate and sulfate are disclosed.

25 Claims, 8 Drawing Figures

ANION MONITORING SYSTEM

BACKGROUND OF THE INVENTION

This invention relates generally to methods and systems for determining the concentration of anions in an aqueous solution. More particularly, the invention is concerned with monitoring the concentration of such pollutants as inorganic phosphate and sulphate in natural bodies of water such as lakes, streams and rivers.

Recently, much concern has been expressed about pollution of our natural waters. Major causes of such pollution are various chemicals which are emptied into rivers and lakes. Inorganic phosphates and sulfates are two such pollutants. Phosphates are an especially undesirable pollutant because an excess of phosphate favors the development of various algae which thrive in a phosphate-rich environment. As the algae multiply, die, and decompose, the amount of dissolved oxygen in a body of water is greatly reduced. Consequently, an ecological balance is upset. Other forms of aquatic life are affected by the reduction in oxygen and some of them are unable to survive. Ultimately, an excess of phosphate is to man's detriment, since useful life forms such as fish may die. Also, the natural beauty of the waters is adversely affected.

Because of the growing concern about the above effects of pollution, governmental bodies have been urged to take a more active part in monitoring pollution levels through the enactment and enforcement of laws directed at maintaining or restoring man's environment. The regulation of pollution levels for anions such as phosphate or sulfate requires instruments and/or methods for quickly and accurately determining their concentrations, even at relatively low levels. Various methods for determining low concentrations of inorganic phosphate and sulfate are well known. For example, both phosphate and sulfate concentrations can be measured by classical analytical techniques. Those methods, however, are time consuming and, in many cases, non-specific to such anions as phosphate in the presence of interfering materials (e.g. silicates). Also, there are enzymatic methods for determining low concentrations of inorganic phosphate. See, for example, Schultz, D. W. et al., Anal. Biochem. 19, 300 (1967). Even those methods, however, have disadvantages. Known enzymatic analysis methods are rather expensive, time-consuming, and generally cannot be used in a continuous monitoring system. Thus, there is a need for a monitoring system that can determine anion concentrations quickly, accurately and continuously. The present invention serves that need.

SUMMARY OF THE INVENTION

A continuous flow monitoring system for determining the concentration of anions in an aqueous solution has been discovered. The system is based on the inhibiting effect of an anion on the enzymatic hydrolysis of an ester of the anion. The inhibiting effect of a given anion will vary directly with its concentration. Thus, by determining the amount of enzymatic hydrolysis that occurs in the presence of a known volume of the anion solution, the concentration of the anion can be determined. Further, by using an ester which hydrolyzes to a photometrically measurable product, a monitoring system is provided whereby anion concentrations can be determined in a quick and continuous manner. The system disclosed is particularly suitable for monitoring inorganic phosphate and sulfate concentrations.

DETAILED DESCRIPTION OF THE INVENTION

To understand the present monitoring system, consideration should be given to the three hydrolysis reactions given below wherein X represents an ion of unknown concentration, e.g. phosphate, sulfate, acetate, etc.) and R–X represents a known amount of the ester of the anion X which can be hydrolyzed by an enzyme designated X-ase (an esterase). The amounts of R–X and X-ase are known in all three equations.

All of the above reactions are shown in a state of equilibrium. Equation (1) represents the hydrolysis of R–X in the presence of X anions (non-enzymatic hydrolysis). Equation (2) represents the hydrolysis of R-X in the presence of X anions and X-ase (enzymatic hydrolysis). As can be seen, the presence of X-ase tends to catalyze the reaction to the right while the presence of X tends to inhibit the catalysis by promoting the reaction to the left. Equation (3) represents the hydrolysis of R-X in the presence of X-ase alone (enzymatic hydrolysis).

By determining the respective amounts of R–OH produced in each of the above reactions, the percent hydrolysis of R–X to R–OH that is attributable to X-ase in the presence of X can be known. More specifically, if the amount of R–OH in equation (1) is considered as a base line representing 0 percent enzymatic hydrolysis, and the amount of R–OH in equation (3) represents 100 percent enzymatic hydrolysis, then the amount of R–OH produced in equation (2) can be expressed as the percent enzymatic hydrolysis that occurs despite the inhibiting effect of anion X. That percent hydrolysis will be less than the 100 percent of equation (3) because of the presence of X, but more than the 0 percent enzymatic hydrolysis of equation (1) because of the catalytic action of the X-ase.

As shown below, the reciprocal of the percent hydrolysis determined (1/HYD) is directly related to the concentration of the anion X. In the case of phosphate measurements, the direct relation between 1/HYD and phosphate concentration is linear. Thus, by determining the amounts of R–OH produced in the reactions of equations (1), (2), and (3) when a known volume of aqueous X is used, the concentration of X solution can be readily determined.

The present invention contemplates systems for the determination of the concentration of any anion that meets the following requirements: First, the anion must be capable of forming an inorganic ester of the formula R-X which can be enzymatically hydrolyzed by an esterase enzyme. Second, the hydrolysis reaction should be capable of attaining equilibrium within a relatively short period of time. Preferably, equilibrium should be reached within the first few minutes, although a reasonable delay in attaining equilibrium will be tolerable to the extent that it would be practical to have delays as long as one hour or more. Third, for increased measuring sensitivity, the equilibrium reaction represented by equation (3) should be as close to 50 percent as practical. Fourth, the ester R–X should be capable of hydrolyzing to a major hydrolysis product, R–OH, the amount of which can be determined photometrically.

As used herein, the terms photometry, photometric, and photometrically, refer to methods and/or systems for determining the concentration of substances in an aqueous solution which are based on differences in the absorbance or reflectance of light by solutions. Thus, the present invention contemplates R–OH determinations by means of colorimeters, spectrophotometers, fluorimeters, and visual means such as color comparison charts. For descriptions of various photometric techniques that can be used with the present invention, see Alexeyev, V., "Quantitative Analysis," Gorden and Breach, Scientific Publishers, New York, New York, (1969), especially p. 394 et seq. The above photometric techniques permit quick and continuous determinations of R–OH and, consequently, quick and continuous determinations of the concentration of the anion being measured.

As can be readily appreciated, an important basis for the monitoring system is the esterase enzyme. In preferred embodiments, the enzyme used is insolubilized. The terms insoluble, or insolubilized, when applied to the enzymes described hereunder, refer to enzymes which have been made essentially water insoluble by bonding or coupling to an essentially inert water insoluble carrier. The carrier may be organic or inorganic. Insolubilized enzymes are preferred for economy purposes since they can be used repeatedly in the system without significant loss in either amount or activity.

Another important basis for the monitoring system is the ester R–X and its ability to hydrolyze to a product that can be measured photometrically. Thus, the ester should be chromogenic. As used herein, the term "chromogenic" when applied to esters refers to an ester which hydrolyzes to a photometrically detectable hydrolysis product (R–OH). Examples of inorganic esters which yield colored hydrolysis products are R–X esters wherein the R group represents p-nitrophenyl. On hydrylysis, such esters will yield p-nitrophenol which, in solution, has a greenish color the intensity of which varies with its concentration. Thus, differences in the concentration of p-nitrophenol can be readily determined photometrically.

To better understand the present monitoring system, reference should be made to the accompanying drawings wherein.

Returning to FIG. 1, it can be seen that known volumes of a TEST SOLUTION containing an unknown concentration of the anion to be measured and a STANDARD SOLUTION containing a known amount of a chromogenic ester of the anion are continuously or periodically introduced into a mixer and then into individual compartments of a ROTARY VALVE UNIT. Periodic acceptance, mixing, and discharge of the mixed TEST SOLUTION and STANDARD SOLUTION may be controlled by a programmer and suitable PUMP means to provide a periodic flow of the combined solutions through a reference cell (FIRST CELL) of a dual beam spectrophotometer. At that point, the reference cell photometrically determines, analyzes, and records the amount of major hydrolysis product (R–OH) that is present before the enzymatic hydrolysis occurs. This permits a hydrolysis base line (representing 0 percent enzymatic hydrolysis) to be determined and recorded. After the base line is recorded, the mixed solution is introduced into a refrigerated column wherein the solution is contacted with insolubilized X-ase contained in the column. The reaction described generally by equation (2) above occurs within the column. After the mixed solution has contacted the enzyme in the column, it is permitted to flow out of the column and through the SECOND CELL of the spectrophotometer. At the SECOND CELL, the amount of R-OH is again determined and recorded. This amount of R-OH, when charted between the base line amount of R–OH [equation (1)] and the previously recorded maximum amount of R-OH produced in the absence of the anion [equation (3)], can be recorded as the percent hydrolysis that has occurred due to the insolubilized enzyme. By thus determining the percent hydrolysis, the concentration of the anion in the TEST SOLUTION can be readily determined from a graph prepared in accordance with the methods described in the specific examples given below. After the mixed solution has passed through the SECOND CELL, it may be passed into a suitable COLLECTOR such as a beaker.

The described monitoring system of FIG. 1 can be better understood with reference to the specific examples given below wherein the concentrations of inorganic phosphate and sulfate were successfully monitored.

EXAMPLE I

Concentrations of inorganic phosphate were measured by determining the inhibiting effect of the phosphate ions on the enzymatic hydrolysis of p-nitrophenyl phosphate by alkaline phosphatase. Phosphatases are well-known enzymes that catalyze the hydrolysis of a wide variety of phosphate esters. These esters include the esters of primary and secondary alcohols, sugar alcohols, cyclic alcohols, phenols, and amines. Phosphatases are classified as acid or alkaline depending on their pH of optimum activity. The optimum pH for acid phosphatase is 5–6; for alkaline phosphatase the optimum pH is 8–10.

P-nitrophenyl phosphate was selected as a preferred ester (or substrate) because, as noted above, it yields a colored hydrolysis product. The reactions involved in the phosphate determinations described below can be summarized by the following equations:

(4)

(5)

(6)

Figure 1:
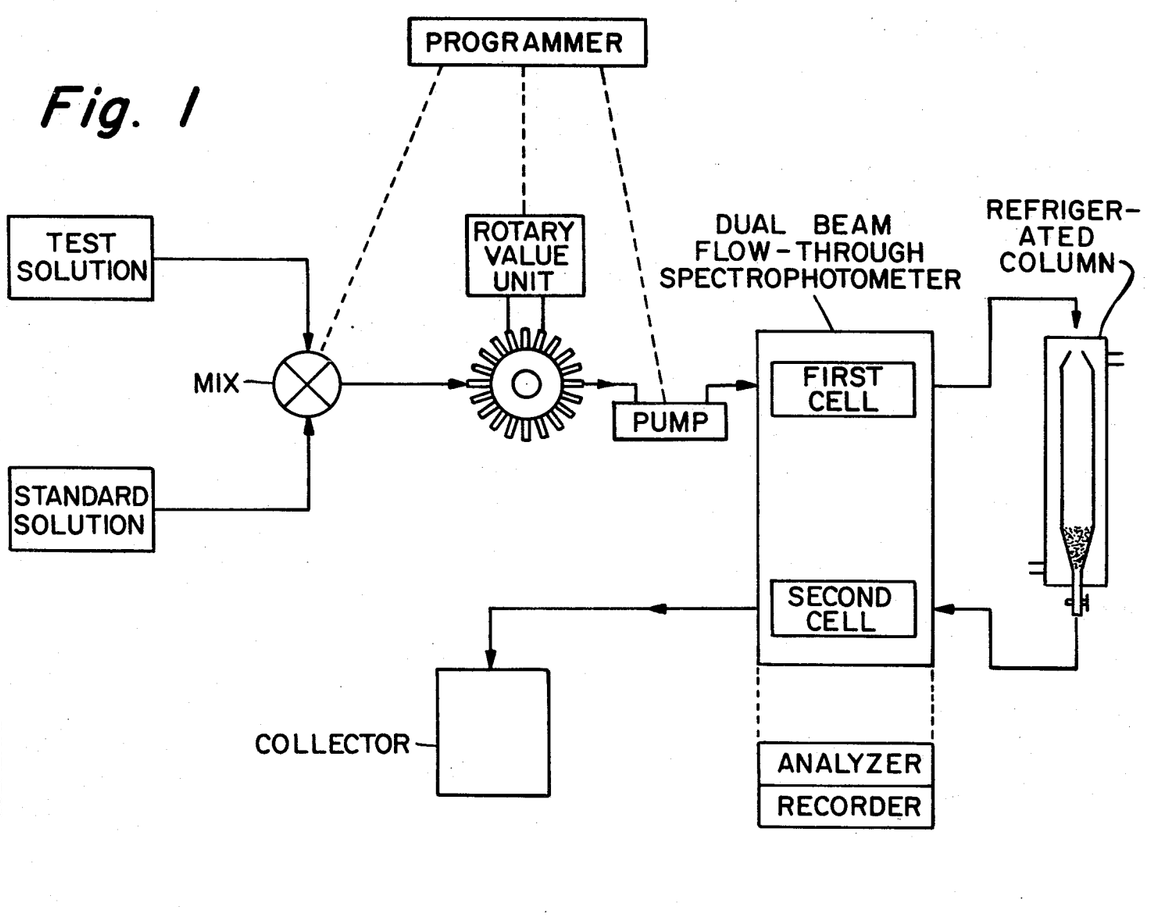
FIG. 1 is a schematic representation of anion monitoring system that may employ the principles of the invention.

The respective amounts of p-nitrophenol were determined photometrically in accordance with the system described in FIG. 1. To prepare that system for phosphate determinations, the following steps were taken.

Preliminary Steps

When insolubilized phosphatase is used, it can be placed in any convenient flow-through container such as the column shown in FIG. 1. In using a column, certain preliminary steps should be taken. These steps relate to the preparation of the insolubilized phosphatase, the determination of its enzyme activity, and, finally, the preparation of an insolubilized phosphatase system. In the specific steps that follow, the organic phosphate ester used throughout is p-nitrophenyl phosphate and its major hydrolysis product measured is p-nitrophenol. The phosphatase used throughout is alkaline phosphatase.

Preparation of Insolubilized Alkaline Phosphatase

Bacterial alkaline phosphatase (33.5 units/mg.) was insolubilized by covalently bonding it to porous 96 percent silica glass by known means. See Weetall, H. H., Nature 223, 959 (1969). The porous glass had a pore diameter of 550A ±8 percent and a particle size of 40/60 mesh.

Determination of Alkaline Phosphatase Activity

Since this specific monitoring system is based on the inhibition by phosphate of the hydrolysis of a phosphate ester by alkaline phosphatase, it is necessary to determine the activity of the alkaline phosphatase so that the maximum expected hydrolysis, in the absence of inorganic phosphate, can be known. The alkaline phosphatase activity was determined by a modified method of Garen, A., and Levinthal, C., in Biochem. Biophys. Acta. 38, 470 (1960). To a known weight of the insolubilized alkaline phosphatase was added a volume of 0.001 M p-nitrophenyl phosphate in 1 M TRIS, pH 9. The enzyme reaction p-nitrophenyl was continued for a predetermined time, stopped by rapid filtration, and the filtrate was read spectrophotometrically to determine the amount of major hydrolysis product (p-nitrophenol) produced by the known weight of insolubilized alkaline phosphatase. The spectrophotometer reading was taken at a wavelength of 410 nm and the molar absorbtivity of p-nitrophenol in 1 M TRIS pH 8 was taken at a = 1.62 $\times 10^4$. Once the amount of the product (p-nitrophenol) was determined, the activity of the alkaline phosphatase was determined in units (1 unit — 1 $\mu$ mole of product produced/minute at 25° C.).

Preparation of the Insolubilized Enzyme System

The studies with the above-described insolubilized alkaline phosphatase were carried out in refrigerated columns. Generally, these columns were maintained at 6° ±1° C. This temperature was chosen to maximize the working life of the column. However, it is not essential that the column be refrigerated. Thus, the column may be operated at room temperature and still provide the desired hydrolysis.

The entire experimental system can be better understood by referring again to FIG. 1. In that system, solutions containing amounts of p-nitrophenyl phosphate (STANDARD SOLUTION) and known volumes of various concentrations of inorganic phosphate and/or acetate, carbonate, nitrate, or sulfate (TEST SOLUTION) were mixed and introduced into the ports of a twenty port rotary valve unit. The combined solution (Standard Solution and Test Solutions of varying concentrations) were then periodically pumped through a one centimeter flow-through spectrophotometer cell and the product concentration (R–OH) was determined at 410 nm. After this pre-enzymatic hydrolysis product concentration was analyzed and recorded, the solutions were passed through the column containing the insolubilized alkaline phosphatase where enzymatic hydrolysis occurred. After leaving the column, the product concentrations (R–OH) were again determined spectrophotometrically at 410 nm. These post-enzymatic hydrolysis product concentrations, when compared with the base line concentrations, and the maximum product concentration expected in the absence of inorganic phosphate, yielded the percent hydrolysis that had taken place in the column in the presence of inorganic phosphate and/or other anions.

Relating Phosphate Concentration to Percent Hydrolysis

Phosphate concentrations were determined from a standard curve prepared beforehand by adding increasing known quantities of inorganic phosphate to 0.0125 M TRIS, pH 9 or 0.25 M sodium bicarbonate, pH 9 in a given concentration of p-nitrophenyl phosphate solution. The mixed solutions were then passed through spectrophotometer cells before and after contact with the enzyme. The respective concentrations of p-nitrophenol were determined. The molar absorptivity for p-nitrophenol in 0.0125 M TRIS, pH 9 was experimentally determined as 1.35 $\times 10^4$.

Maximum hydrolysis was determined in the absence of any inorganic phosphate. The percent hydrolysis of a test solution was then calculated from the ratio of the absorbence change of the test solution ($A_i$) to that of maximum hydrolysis ($A_{max}$) [$A_i/A_{max} \times 100$]. Inhibition of hydrolysis was also reported as a percentage, $1 - A_i/A_{max} \times 100$.

Anionic (non-phosphate) effects were reported as ratios of the maximum hydrolysis observed in the absence of added anions. All values reported are averages with standard deviations, where possible.

In order to ascertain the feasibility of monitoring unknown phosphate concentrations, several samples containing inorganic phosphate at various dilutions were prepared. The solutions were made $5 \times 10^{-5}$ M p-nitrophenyl phosphate and 0.25 M sodium bicarbonate pH 9. These solutions were passed through the column as previously described. The absorbence change of the solution at 410 nm was monitored and the percent hydrolysis determined. The phosphate concentration was determined from the standard curve.

Determination of Flow Rate Effects

For these studies, various concentrations of p-nitrophenyl phosphate were used ranging from $1 \times 10^{-5}$ M to $1 \times 10^{-2}$ M, in 0.0125 M TRIS, pH 9. The solution was passed through the column at increasing flow rates ranging from 180 ml/hr. to 540 ml/hr. After the column reached an equilibrium at a given flow rate, the percent hydrolysis of the column effluent was determined.

Determination of Column Stability

The column previously used for studying the effect of flow rates was operated continuously at room temperature with $1 \times 10^{-4}$ M p-nitrophenyl phosphate in 0.0125 M TRIS, pH 9. Flow rate was maintained at 1 ml/min. Daily samples were taken and the percent hydrolysis was calculated.

Activity of the Insolubilized Enzyme Preparation

In a two-minute assay, the insolubilized preparation of alkaline phosphatase was found to have 22.2 units of activity per gram of material. Over the two-month period of use, this material appeared to lose no activity.

Determinations of Phosphate Concentrations

Figure 3:
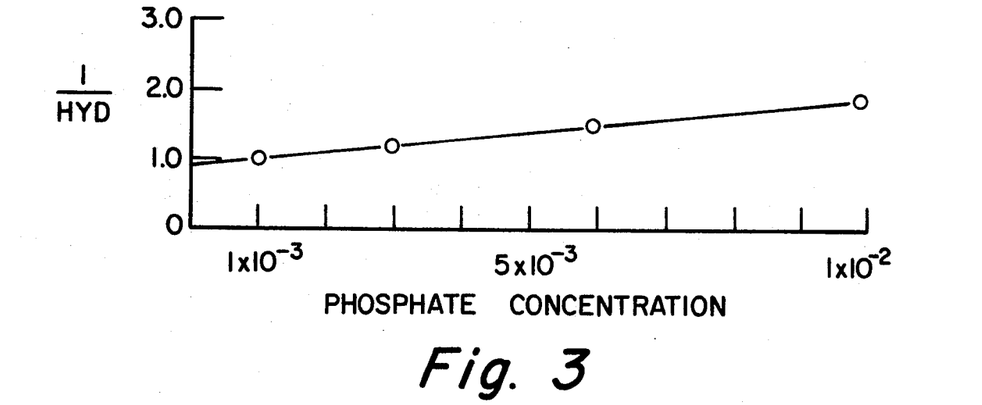
FIGS. 3, 4, and 6 are phosphate inhibition curves relating 1/HYD to inorganic phosphate concentration.
Figure 4:
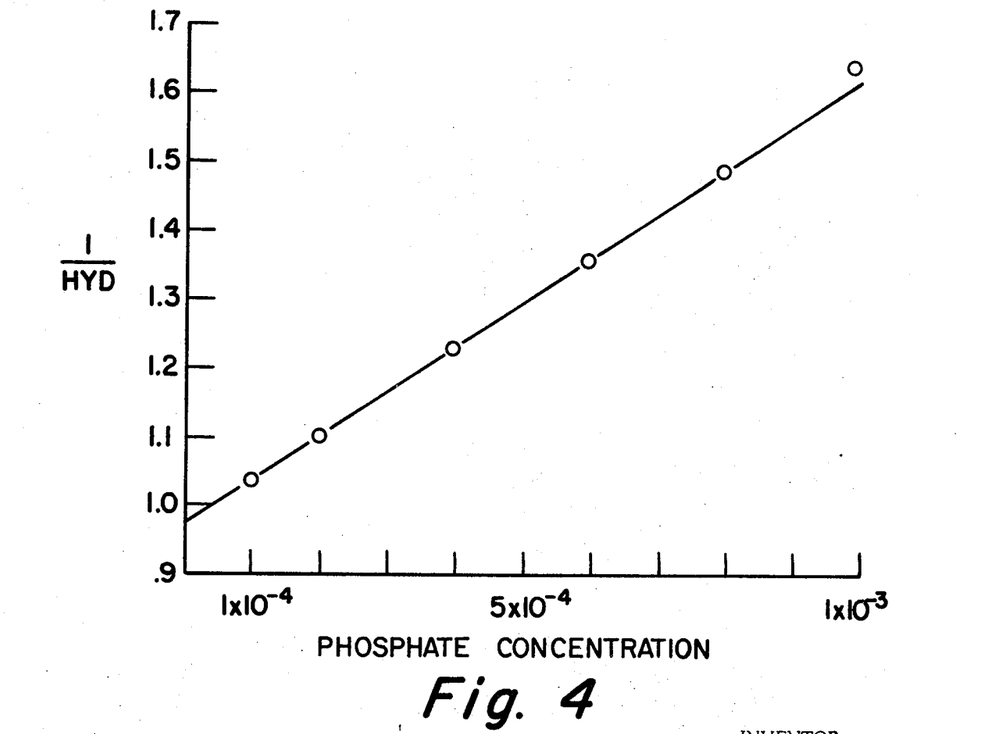

The results observed when varying amounts of inorganic phosphate were added to the substrate p-nitrophenyl phosphate are demonstrated in FIGS. 3 and 4. In both figures, the reciprocal of the ratio of the amount of hydrolysis observed to the maximum hydrolysis possible by the system is shown as a function of the concentration of inorganic phosphate (Pi) in the mixed solution. The data presented in FIG. 3 were obtained from a column (1 cm × 14 cm) containing 38.2 units of activity. The flow rate was 1.8 ml/min. The data of FIG. 4 were obtained with a column (1 cm ×9 cm) containing 6.24 units of activity. The sensitivity of this system was increased by a factor of 6.46 by decreasing the amount of enzyme in the column by a factor of 6.13.

When the substrate (R-PO₄) concentration was decreased from $1 \times 10^{-4}$ M to $5 \times 10^{-5}$ M, the percent inhibition at decreasing phosphate concentrations was substantially unaffected as shown in Table I below. It was noted that the lower substrate concentration improved reproducibility as shown by the smaller standard deviations.

TABLE I

EFFECT OF DECREASING SUBSTRATE CONCENTRATION ON PHOSPHATE INHIBITION USING P-NITROPHENYL PHOSPHATE AS SUBSTRATE

PERCENT INHIBITION

| (Pi) | $S_o = 1 \times 10^{-4}$ M | $S_o = 5 \times 10^{-5}$ M |
|---|---|---|
| 0.1 M | (89.0±1.3)% | (89.4±0.6)% |
| 0.05 M | (83.0±2.0)% | (83.1±0.6)% |
| 0.01 M | (53.2±5.3)% | (50.1±2.9)% |
| 0.005 M | (37.7±7.2)% | (30.5±2.4)% |
| 0.001 M | (4.1±3.1)% | (4.1±0.8)% |
| 0.0005 M | (1.3±1.6)% | (2.6±0.9)% |
| 0.0001 M | (0.6±1.1)% | (1.5±0.3)% |

The column contained 38.2 units of activity. The buffer was 0.0125 M TRIS, pH 9. The flow rate was maintained at 1.8 ml. per min. (Pi) represents inorganic phosphate concentration. So represents the initial substrate (p-nitrophenyl phosphate) concentration.

Changing the buffer from 0.0125 M TRIS, pH 9 to 0.25 M sodium carbonate or 0.25 M sodium bicarbonate adjusted to pH 9 with HCl or NaOH improved the phosphate inhibition values slightly by stretching the total span of percent inhibition by 13 percent. See Table II below.

TABLE II

[The percent inhibition of hydrolysis by alkaline phosphatase as a function of inorganic phosphate concentration, buffer and column size]

| | Percent inhibition | | | |
|---|---|---|---|---|
| (Pi) M | Large column, 0.0125 M TRIS, pH 9 | Small column, 0.0125 M TRIS, pH 9 | Small column, 0.25 M Na₂CO₃, pH 9 | Small column, 0.25 M NaHCO₃, pH 9 |
| 0.01 | 47.6±1.4 | 89.8±1.4 | 84.9±1.5 | 89.9±1.6 |
| 0.006 | 34.2±1.2 | 83.8±0.9 | 79.5±0.6 | 83.0±0.8 |
| 0.003 | 16.2±0.6 | 72.5±1.6 | 64.8±1.9 | 69.1±1.9 |
| 0.001 | 2.3±0.9 | 47.0±2.5 | 35.0±1.9 | 39.2±2.3 |
| 0.0008 | 1.4±1.0 | 42.1±2.8 | 29.6±1.6 | 33.1±2.1 |
| 0.0006 | 1.1±0.8 | 36.6±2.3 | 23.3±1.7 | 26.5±1.9 |
| 0.0004 | 1.5±1.0 | 29.1±1.7 | 15.7±1.1 | 18.6±1.7 |
| 0.0002 | 1.5±1.0 | 20.7±1.6 | 7.9±0.7 | 8.8±1.1 |
| 0.0001 | 0.9±0.5 | 14.1±1.8 | 3.6±0.4 | 4.0±0.9 |

(Pi) = Inorganic phosphate. Substrate for these studies was $5 \times 10^{-5}$ M p-nitrophenyl phosphate. The large column contained 38.2 units of activity. The small column contained 6.24 units of activity. Flow rates were maintained at 1.8 ml./min.

Anion Effects

The presence of other anionic (non-phosphate) species in solution with TRIS buffer significantly increased the activity of the insolubilized alkaline phosphate, as shown in TABLE III below. However, the same solutions in the sodium carbonate buffer gave no apparent effect upon the enzyme activity (Table III), thus eliminating anionic effects.

TABLE III

[The effect of common anions on insolubilized alkaline phosphatase activity in TRIS and carbonate buffers]

| | Hydrolysis, salt concentrations | | | | |
|---|---|---|---|---|---|
| Salt buffer | 0 M | .001 M | .01 M | .1 M | .5 M |
| NaNO₃: | | | | | |
| 0.0125 M TRIS | 1.00 | 1.37±.01 | 1.53±.01 | 1.60±.01 | 1.61±.03 |
| 0.25 M Na₂CO₃ | 1.00 | 1.00±.01 | 1.00±.01 | 1.01±.01 | 1.00±.01 |
| Na₂SO₄: | | | | | |
| 0.0125 M TRIS | 1.00 | 1.66±.02 | 1.80±.02 | 1.85±.03 | 1.81±.05 |
| 0.25 M Na₂CO₃ | 1.00 | 1.00 | 1.00±.01 | 1.00±.01 | 1.00±.01 |
| CH₃COONa: | | | | | |
| 0.0125 M TRIS | 1.00 | 1.25±.02 | 1.38±.02 | 1.41±.03 | 1.40±.02 |
| 0.25 M Na₂CO₃ | 1.00 | 0.99±.01 | .099±.01 | 0.99±.01 | 0.98±.01 |
| Na₂CO₃ | | | | | |
| 0.0125 M TRIS | 1.00 | 1.19±.02 | 1.26±.02 | 1.27±.01 | 1.2±.02 |

Note.—All buffers were adjusted to pH 9. Flow rates were maintained at 1.8 ml./min. The column used contained 6.24 units of activity. p nitrophenyl phosphate concentration was $5 \times 10^{-5}$ M.

Determination of Phosphate Concentration in Unknown Phosphate Solutions

The results of these studies are presented in Table IV. The experimentally determined values were all within the standard deviation of the system. In the case of the river water, initial phosphate concentrations were below $4 \times 10^{-7}$ M and, therefore, did not significantly increase the added phosphate concentration.

TABLE IV

PHOSPHATE DETERMINATION OF UNKNOWN SOLUTIONS

| Added Components To Test Solution | Actual Phosphate Concentration | Experimental Phosphate Concentration |
|---|---|---|
| None | $3.0 \times 10^{-4}$ M | $2.6 \times 10^{-4}$ M |
|  | $9.0 \times 10^{-4}$ M | $9.0 \times 10^{-4}$ M |
| .001 M NaNo$_3$ + | $3.0 \times 10^{-4}$ M | $2.9 \times 10^{-4}$ M |
| .01 M Na$_2$SO$_4$ | $9.0 \times 10^{-4}$ M | $8.9 \times 10^{-4}$ M |
| River Water | $3.0 \times 10^{-4}$ M | $3.0 \times 10^{-4}$ M |
|  | $9.0 \times 10^{-4}$ M | $9.2 \times 10^{-4}$ M |

Test solutions were $5 \times 10^{-5}$ M p-nitrophenyl phosphate and 0.25 M sodium bicarbonate, pH 9. The column contained 6.24 units of activity. The flow rate was maintained at 1.8 ml/min.

Effect of flow rate

At substrate concentrations between $1 \times 10^{-5}$ M and $1 \times 10^{-4}$ M and flow rates ranging from 180 ml/hr. to 540 ml/hr., percent hydrolysis of substrate was relatively constant as shown in Table V. It was also noted that at any given flow rate, the percent hydrolysis remained constant over the range of substrate concentrations of $1 \times 10^{-5}$ M to $1 \times 10^{-4}$ M. Above $1 \times 10^{-4}$ M substrate, the percent hydrolysis dropped with increasing substrate concentration (Table V).

TABLE V

EFFECT OF FLOW RATES ON PERCENT HYDROLYSIS AT VARIOUS SUBSTRATE CONCENTRATIONS

PERCENT HYDROLYSIS

| Substrate Concentration | 180 ml/hr. | 300 ml/hr. | 420 ml/hr. | 540 ml/hr. |
|---|---|---|---|---|
| $1 \times 10^{-5}$ M | 74% | 74% | 71% | 68% |
| $2.5 \times 10^{-5}$ M | 75% | 74% | 73% | 70% |
| $5 \times 10^{-5}$ M | 72% | 73% | 73% | 74% |
| $1 \times 10^{-4}$ M | 74% | 74% | 74% | 74% |
| $1 \times 10^{-3}$ M | 69% | 64% | 60% | 62% |
| $2.5 \times 10^{-3}$ M | 46% | 48% | 53% | 51% |
| $5 \times 10^{-3}$ M | 42% | 42% | 38% | 28% |
| $1 \times 10^{-2}$ M | 38% | 30% | 27% | 25% |

The percent hydrolysis was determined as the percent of total substrate hydrolyzed. All experiments were carried out at room temperature in 0.0125 M TRIS, pH 9.

Stability of Insolubilized Enzyme

Figure 5:
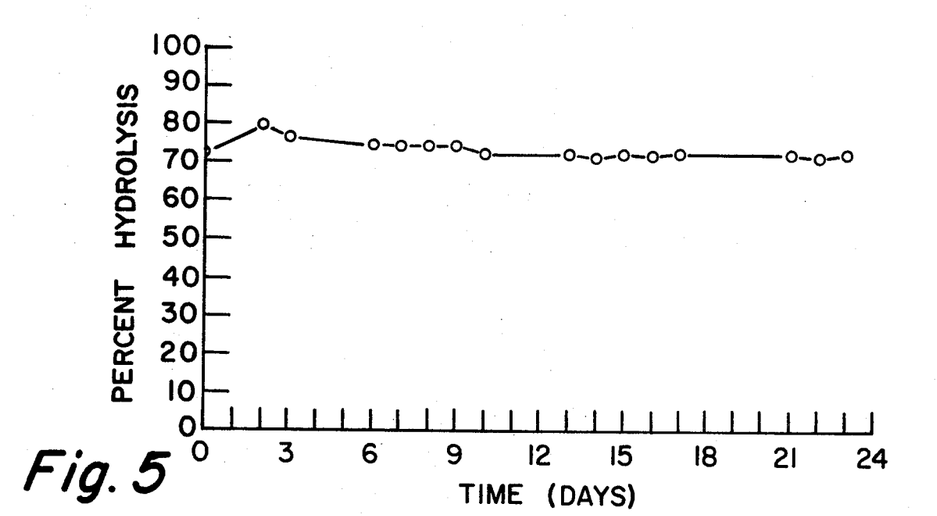
FIG. 5 is a plot showing the effect of time on the continuous operation of a specific phosphate monitoring system discussed below.

The activity of the insolubilized alkaline phosphatase used for continuous operation studies remained unchanged over 23 days of continuous operation at room temperature (FIG. 5). For the results shown in that figure, the substrate was $1 \times 10^{-4}$ M p-nitrophenyl phosphate in 0.0125 M TRIS, pH 9. The system was operated at room temperature with a flow rate of 1 ml/min.

Figure 6:
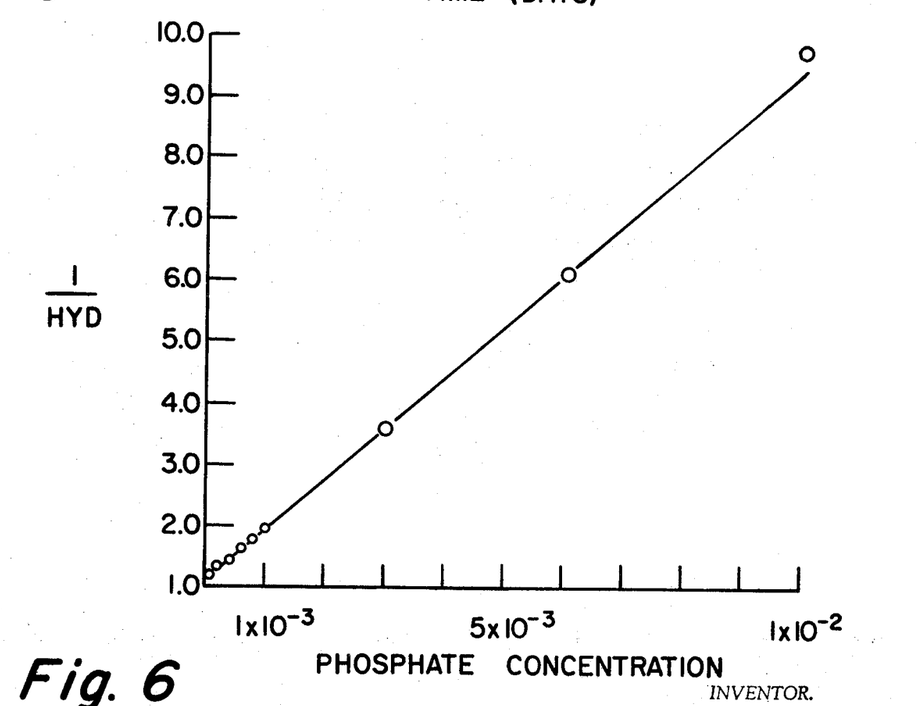

Although it was known that the hydrolysis of p-nitrophenyl phosphate by alkaline phosphatase is subject to competitive inhibition by inorganic phosphate, it was surprisingly found that the reciprocal of the percent hydrolysis as a function of increasing concentration of phosphate is a linear relationship. The linearity of this relationship over two orders of magnitude ($1 \times 10^{-2}$ M to $9 \times 10^{-4}$ M) is shown in FIG. 6.

One should expect that if the ratio of phosphate to enzyme is increased enough there should be a more profound effect on the enzyme's inhibition by the phosphate due to the increase chances of contact. This increase in inhibition should be independent of flow rate. This was experimentally shown with the results from the smaller column which had approximately one-sixth of the amount of enzyme that the larger column had (Table II). This improvement was observed as an approximately six-fold increase in the slope of the straight line of the reciprocal hydrolysis ratio versus phosphate concentration plot (FIG. 4).

Since one of the primary purposes of this invention was to monitor phosphate concentrations in solution, potentially for rivers, etc., and since one would expect significant concentrations of other anions (e.g. carbonate, sulfate, nitrate) in the water to be tested, it may be necessary to eliminate or cancel the variability induced in this system by fluctuating ionic concentrations. This may be easily accomplished by buffering the experimental solutions, not in TRIS, but in a high concentration of an inorganic ionic salt (e.g. sodium carbonate or sodium bicarbonate) as explained above. Four improvements are thus achieved. First, the high ionic concentration increases the apparent activity of the enzyme (Table III). Second, while the inhibition values for the phosphate solutions are not changed, their reproducibility is improved with the use of the ionic buffer (Table II). Third, all further ionic fluctuations are masked by the high ionic concentration of the carbonate buffer (Table III). And fourth, removal of TRIS from the system eliminates any un-accounted variation of phosphate concentration resulting from Transphosphorylation of the TRIS.

Monitoring River Water

Figure 2:
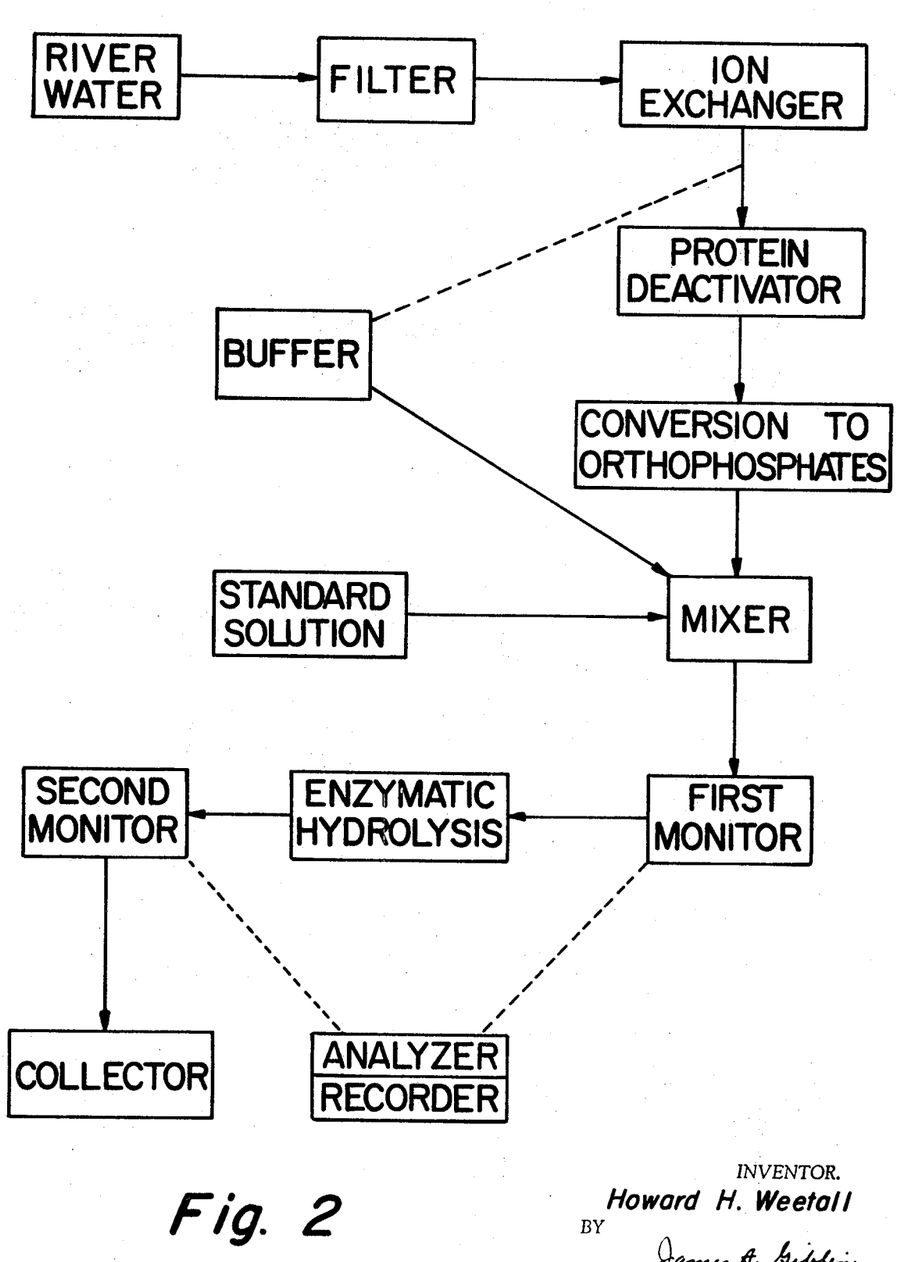
FIG. 2 is a diagrammatic representation of a more practical system that may be used when the source of an ion such as phosphate is water from a natural body (e.g. a lake or river) which may require various pretreatment steps.

A more practical system for monitoring the phosphate concentration of natural waters is shown in FIG. 2. The phosphate monitoring system of FIG. 2 is based on the same principle shown in FIG. 1. In FIG. 2, however, there are shown certain preliminary steps that may be taken when the phosphate is from an unknown source which may contain materials that could interfere with the basic monitoring system of FIG. 1. For example, since river water would be expected to contain various microorganisms and particulate matter that could interfere with the monitoring system, these may be easily removed by passing the river water initially through a filter. A 5 micron filter was found suitable for removing most particulate matter. Thus, in a practical embodiment of the present invention, RIVER WATER is first passed through a FILTER and then into an ION EXCHANGER which removes cations such as heavy metals which could poison the enzyme system.

The sample water is then treated to deactivate any protein that may have passed through the filter. Proteinaceous materials are deactivated (PROTEIN DEACTIVATOR) to avoid interference with the phosphatase system and such deactivation may be brought about by any of several well-known means for protein deactivation, e.g. heat, or the enzymatic action of a protease will deactivate proteins present. If enzymatic deactivation methods are employed, a suitable BUFFER is added prior to contact with the protease. See the broken line from BUFFER.

After any proteins present have been deactivated the water sample may be treated to convert forms of phosphate other than inorganic phosphate to orthophosphates (CONVERSION TO ORTHOPHOSPHATES). The monitoring system of FIG. 1 will accurately measure only inorganic phosphates which are considered orthophosphates. In some cases, however, it may be desirable to measure total phosphates in a water sample (non-orthophosphates). Examples of such non-orthophosphates are pyrophosphates and sodium tripolyphosphates (STPP). STPP is the phosphate most commonly associated with detergents. Since neither pyrophosphates nor STPP are considered orthophosphates, their respective amounts could not be determined directly by the system disclosed in FIG. 1. However, water samples containing pyrophosphates and/or STPP may be treated in a simple manner (CONVERSION TO ORTHOPHOSPHATES) so that they are broken down to orthophosphates which may then be measured by the basic monitoring system disclosed. For example, if a solution known to contain pyrophosphate were contacted with the enzyme pyrophosphatase, the following reaction occurs.

pyrophosphate $\overset{pyrophosphatase}{\rightleftarrows}$ orthophosphate

Likewise, if a solution containing STPP were contacted with alkaline phosphatase prior to being used in the present system, the following reaction would occur:

STPP $\overset{alkaline\ phosphatase}{\rightleftarrows}$ orthophosphate

Thus, it can be readily seen that if the river water in FIG. 2 were passed through columns containing insolubilized pyrophosphatase and insolubilized alkaline phosphatase immediately after the steps of filtration, ion exchange, and protein deactivation, the present monitoring system could measure not only the orthophosphates originally in the river, but also those orthophosphates resulting from enzymatic or other degradation of pyrophosphates and STPP. It should be noted, however, that the conversion to orthophosphate need not be by the enzymatic means described above. Other conversion techniques are known. For example, acidic or alkaline hydrolysis methods will convert other phosphates to orthophosphates.

After conversion to orthophosphate has taken place, a known volume of the thus treated river water is introduced into a MIXER with a known amount of the phosphate ester (represented by STANDARD SOLUTION). An appropriate BUFFER is added to the solutions and they are mixed and then passed through a first cell of a flow-through spectrophotometer represented by FIRST MONITOR where the amount of R-OH is determined and recorded. The mixed solution is then contacted with the phosphatase and ENZYMATIC HYDROLYSIS occurs. The hydrolysis may take place in a column containing insolubilized phosphatase, as shown in FIG. 1, or the hydrolysis may be brought about by adding a liquid enzyme system to the mixed solution. After enzymatic hydrolysis has occurred, the mixed solution is passed through a second spectrophotometer cell (SECOND MONITOR) where the amount of R-OH is again determined and recorded. The mixed solutions may then be collected in any suitable collection means (COLLECTOR).

EXAMPLE II

The monitoring system disclosed in FIG. 1 was also found effective in monitoring sulfate concentrations. The determination of sulfate concentrations was based on the inhibition by sulfate ions of the enzymatic hydrolysis of p-nitrophenyl sulfate by arylsulfatase.

The enzyme used in the example below was β-glucuronidase/arylsulfatase which was coupled to porous glass in the previously described method for coupling the alkaline phosphatase.

Determination of Enzyme Activity

The coupled sulfatase enzyme was assayed with $1 \times 10^{-3}$ M p-nitrophenyl sulfate as a substrate. The substrate was dissolved in 0.25 M $Na_2CO_3$, pH 9.0. The assay was carried out by using 25 ml of p-nitrophenylsulfate (substrate) to which was added a known weight of insolubilized enzyme. The reaction was continued for 5 minutes at which time a sample was taken and read spectrophotometrically at 410 nm. Activity was determined by using a Molar Absorbency index of $1.62 \times 10^4$. See Plocke, D. J. et al. Biochem. 1, 313 (1962). The activity of the final product was 0.3 units/gram derivative (one unit represents the hydrolysis of one $\mu$ mole of substrate/minute at 25° C.).

The remaining studies were carried out in a column by using 1.0g of derivative. The flow system used below was that already described in FIG. 1. As in the phosphate monitoring system, the temperature of the column containing the insolubilized sulfatase was maintained at 6° C. throughout the studies.

Since the enzyme used for determinations of sulfate concentrations was not a pure arylsulfatase enzyme, it was necessary to obtain a pH profile to determine the pH of optimum activity. The pH profile was obtained with p-nitrophenylsulfate at a concentration of $1 \times 10^{-5}$ M, flow rate of 0.67 ml/minute at 6° C. The buffers used were 0.25 M acetate between pH 5.0 to 6.7 and carbonate between 7.8 to 9.0. The results indicated pH optimum was between 9.0 to 9.5.

Activity vs. Flow Rate

An activity vs. flow rate study was carried out at $2.5 \times 10^{-4}$ M p-nitrophenyl sulfate concentration in 0.25 M $Na_2CO_3$ buffer, pH 9.0. The column was maintained at 6° C. The flow rate was varied between 0.67 ml/min. to 3.0 ml/min. These results are given in FIG. 7 wherein it can be seen that the decrease in product is inversely related to the flow rate, although not directly.

Determination of Sulfate Concentrations

Figure 8:
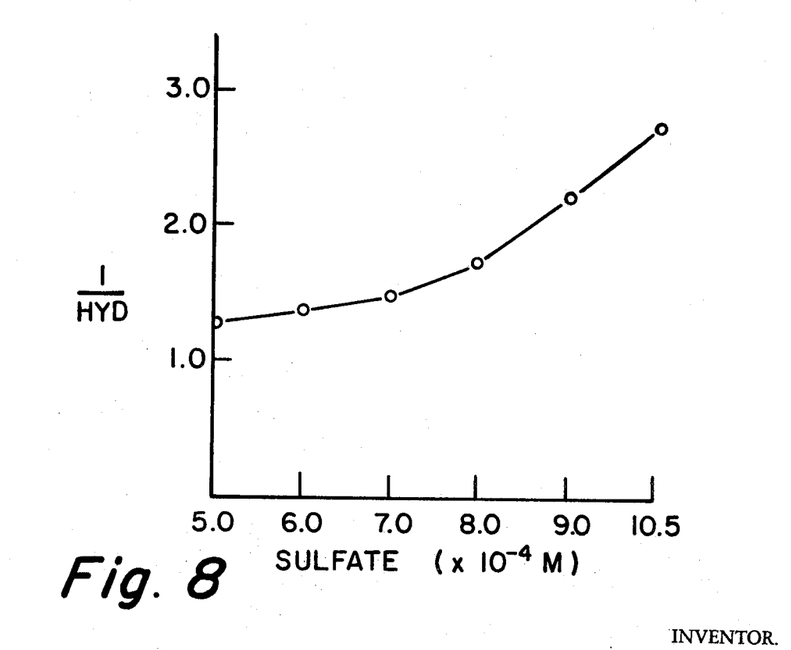
FIG. 8 is a sulfate inhibition curve relation 1/HYD to sulfate concentration.

A monitoring system based on FIG. 1 was set up with a refringerated column containing the insolubilized arylsulfatase. For this experiment, the substrate (p-nitrophenylsulfate) was adjusted to a concentration of $2.5 \times 10^{-4}$ M and the flow rate was 1.07 ml/min. The buffer was 0.25 M $Na_2CO_3$, pH 9.0 and the temperature was maintained at 6° C. The slightly increased flow rate was used in the hope that the flow would be more piston-like. Sulfate was added to various test solutions in concentrations ranging from $5 \times 10^{-4}$ to $10 \times 10^{-4}$ and the sulfate concentrations were then experimentally determined by relating the reciprocals of percent hydrolysis (1/HYD) to the sulfate concentrations. The results are given in FIG. 8 wherein it can be seen that the relation of 1/HYD to sulfate concentration, though not linear, can be readily used to determine unknown sulfate concentrations.

Figure 7:
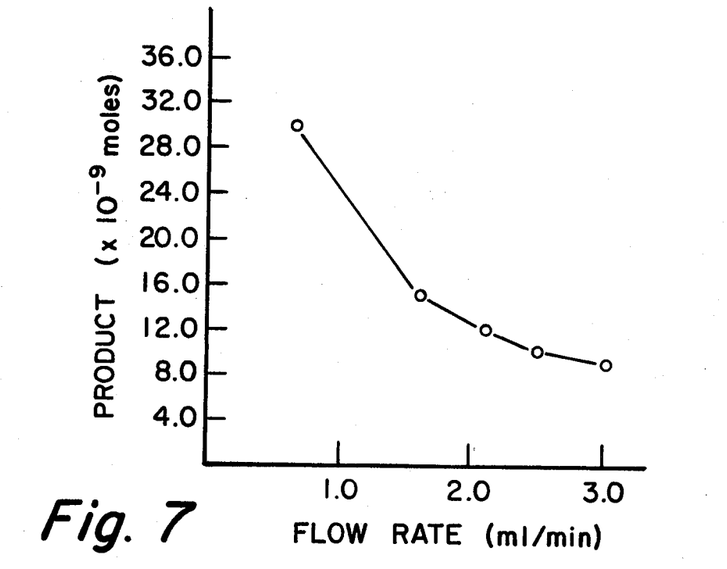
FIG. 7 is a plot showing the effect of flow rate on a specific sulfate monitoring system discussed below.

The major purpose of the sulfate monitoring studies was to determine the feasibility of using sulfate inhibition as a method of detecting sulfate. Another purpose of the sulfate studies was to affirm the workability of the principle on which the phosphate monitoring system is based so that the system could be used for measuring the concentration of other anions. The results in FIG. 8 indicate both goals were met. However, there are several characteristics which make the sulfate monitoring system difficult to use. First, the percent hydrolysis, as shown in FIG. 7, was affected by the flow rate. This indicated the sulfate monitoring system was not yet in equilibrium. Possible increasing the arylsulfatase enzyme concentration could accomplish this requirement for rapid and sensitive sulfate monitoring. One of the major advantages of the phosphate monitoring system was that all inhibition studies were carried out under equilibrium conditions. There, the system was shown to be rather insensitive to substrate concentrations, enzyme concentrations, and flow rates.

In order to increase the enzyme concentration, it would be necessary to obtain a more pure sulfatase enzyme. This is at present not commercially available. Another method of accomplishing the same result would be to slow down the flow rate to that point at which equilibrium is reached. This would require about 6,000 seconds to occur. Therefore, the flow rate would be slowed to give a residue time of 100 minutes/ml. of substrate. This time delay may not be acceptable for a fully continuous monitoring system although it would be acceptable for a periodic monitoring system wherein it would be acceptable to monitor sulfate concentrations at 1 ½ to 2 hour intervals.

In general, the better results observed in monitoring the unknown phosphate concentrations indicate the present invention may be used more advantageously to monitor the concentrations of that anion. For example, in the second set of phosphate test solutions, that with the nitrate and sulfate added (Table III), it was found that the anionic effect was overcome. The concentration levels of those two salts were at pollution levels for those ionic species. The data from the river water samples showed that the combination of salts and other pollutants from a mildly polluted river; e.g. microorganisms that remained even after filtration, do not affect the column's accuracy (Table IV). Further, the smaller column was operated daily for 36 days with no significant change in the phosphatase activity. This indicates that such a system could be operated for substantial periods of time unattended. Also, it should be noted that the sensitivity of the phosphate monitoring system may be improved by two methods. One would be to increase the width of the flow-through optical cell. This would have the effect of increasing the absorbence differences for a given change of phosphate concentration in the substrate solution. An increase in sensitivity by a factor of 10 or more could easily be accomplished by this approach. The other method would be with fluorometric techniques with a fluorescent substrate system (e.g. sodium beta-naphthylphosphate). By the second method, the amount of major hydrolysis product may be read fluorometrically instead of colorimetrically.

It should be noted that the anions that can be measured by the disclosed system need not be inorganic. As long as the requirements listed at the beginning of the detailed description of the invention are satisfied, other ionic species can be monitored. For example, acetate concentrations may be measured by determining the inhibiting effect of a known volume of aqueous acetate on the enzymatic hydrolysis of a substrate such as p-nitrophenylacetate by an aryl-ester hydrolase.

As can be readily appreciated, the above systems may be easily varied to meet specialized detection needs or equipment limitations. For example, either a single or dual beam spectrophotometer may be used to photometrically determine percents of hydrolysis. Also, as noted, if a fluorescent R–OH is produced, the percent hydrolysis may be continuously determined by fluorometric means. Lastly, of course, less convenient means for determining R–OH concentrations may be used, as noted above, (e.g. classical analytical techniques).

Further, both a programmer and rotary valve unit are not essential to employ the principles of this invention. Thus, for example, the mixed solution may be passed through photometric cells and be contacted with the enzyme by manual or other means such as by gravity. Lastly, since the percent hydrolysis may be determined by comparing the optical densities of the solutions before and after they pass through the column, any other method of determining those absorbance differences may be used. For example, visual methods may be appropriate in some cases or the use of color intensity comparison charts may be possible depending on the ester used. Thus, it is apparent that the above systems may be modified in a variety of ways without departing from the spirit and scope of the disclosed invention.

I claim:

1. A method for determining the concentration of an anion in an aqueous solution comprising the steps of:

a. mixing a known volume of the aqueous solution with a known amount of an anion ester of the formula R–X wherein R represents an organic group and X represents the anion and R–X is able to enzymatically hydrolyze to a known amount of major hydrolysis product (R–OH), the amount of which can be determined photometrically;

b. photometrically determining the amount of non-enzymatic major hydrolysis product (R–OH) in said mixture;

c. contacting the mixture with an esterase which will hydrolyze the R–X;

d. photometrically determining the amount of major hydrolysis product (R–OH) in the mixture after the contact; and e. relating the respective amounts of R–OH determined in steps (b) and (d) to the known amount of R–OH which would have been enzymatically produced in the absence of the anion to determine the percent hydrolysis of R-X to R-OH that is attributable to the esterase in the presence of the anion and relating the percent hydrolysis to known data which relates percent hydrolysis to anion concentration.

2. The method, as claimed in claim 1, wherein the determination of the anion concentration is made by determining from steps (b) and (d) the percent hydrolysis of R–X to R–OH attributable to the esterase in the presence of the anion, and relating the reciprocal of that percent hydrolysis to the concentration of the anion present in the aqueous solution.

3. The method, as claimed in claim 1, wherein the esterase of step (c) is insolubilized.

4. The method, as claimed in claim 3, wherein the esterase is insolubilized by bonding to an organic carrier.

5. The method, as claimed in claim 3, wherein the esterase is insolubilized by bonding to an inorganic carrier.

6. The method, as claimed in claim 5, wherein the esterase is insolubilized by bonding to porous glass.

7. The method, as claimed in claim 1, wherein the anion measured is phosphate, the ester hydrolyzed is p-nitrophenyl-phosphate, and the esterase used is alkaline phosphatase.

8. The method, as claimed in claim 7, wherein the alkaline phosphatase is insolubilized by bonding to porous glass.

9. A method for determining the concentration of inorganic phosphate in an aqueous solution comprising the steps of:
a. mixing a known volume of the aqueous solution with a known amount of p-nitrophenyl phosphate;
b. spectrophotometrically determining the amount of p-nitrophenol in the mixture;
c. contacting the mixture with alkaline phosphatase;
d. spectrophotometrically determining the amount of p-nitrophenol in the mixture after the contact of (c); and
e. relating the determinations of steps (b) and (d) to the maximum amount of R-OH that could have been produced in the absence of any inorganic phosphate to determine the percent hydrolysis to R-OH, and relating the reciprocal of the percent hydrolysis to the concentration of inorganic phosphate in the aqueous solution.

10. The method, as claimed in claim 9, wherein the alkaline phosphatase is insolubilized.

11. A method for determining the concentration of phosphate in a natural body of water which comprises the steps of:
a. filtering a portion of the water;
b. removing heavy metal ions from the water by ion exchange means;
c. deactivating any proteins present in the water;
d. converting non-orthophosphates present in the water to orthophosphates;
e. mixing a known volume of the water with a known amount of p-nitrophenyl phosphate;
f. photometrically determining the amount of p-nitro-phenol in the water;
g. contacting the water with alkaline phosphatase;
h. photometrically determining the amount of p-nitrophenyl in the water; and
i. determining the percent enzymatic hydrolysis that has occurred and relating the reciprocal of the percent hydrolysis to the phosphate concentration.

12. The method, as claimed in claim 11, wherein the conversion of step (d) is accomplished enzymatically.

13. The method, as claimed in claim 12, wherein the enzyme used is alkaline phosphatase.

14. The method, as claimed in claim 13, wherein the alkaline phosphatase is insolubilized.

15. The method, as claimed in claim 14, wherein the alkaline phosphatase is insolubilized by bonding to porous glass.

16. The method as claimed in claim 11, wherein the alkaline phosphatase is insolubilized by bonding to an inorganic carrier.

17. The method, as claimed in claim 16, wherein the alkaline phosphatase is insolubilized by bonding to porous glass.

18. A method for determining the concentration of sulfate in an aqueous solution comprising the steps of:
a. mixing a known volume of the aqueous solution with a known amount of p-nitrophenylsulfate;
b. spectrophotometrically determining the amount of p-nitrophenol in the mixture;
c. contacting the mixture with arylsulfatase;
d. spectrophotometrically determining the amount of p-nitrophenol in the mixture after the contact of (c);
e. relating the determinations of steps (b) and (d) to the maximum amount of p-nitrophenol that could have been produced in the absence of any sulfate to determine the percent enzymatic hydrolysis to p-nitrophenol, and relating the reciprocal of the percent hydrolysis to the concentration of sulfate in the aqueous solution.

19. The method, as claimed in claim 18, wherein the arylsulfatase is insolubilized.

20. An apparatus for determining the concentration of inorganic phosphate in an aqueous solution and comprising in combination:
a. means for receiving an aqueous solution, determining its optical density, and discharging a solution;
b. a container containing a composite consisting essentially of insolubilized phosphatase; said container adapted to receive a discharged solution from (a) and adapted to permit intimate contact of said discharged solution with the composite;
c. means for discharging the solution from the container of (b); and
d. means for determining the optical density of said discharged solution.

21. The apparatus, as claimed in claim 20, wherein the contained composite of (b) is alkaline phosphatase bonded to porous glass.

22. An apparatus for determining the concentration of sulfate in an aqueous solution and comprising in combination:

a. means for receiving an aqueous solution, determining its optical density, and discharging a solution;
b. a container containing a composite consisting essentially of insolubilized arylsulfatase; said container adapted to receive a discharged solution from (a) and adapted to permit intimate contact of said discharged solution with the composite;
c. means for discharging the solution from the container of (b); and
d. means for determining the optical density of said discharged solution.

23. The apparatus, as claimed in claim 22, wherein the contained composite of (b) is arylsulfatase bonded to porous glass.

24. An apparatus for determining the concentration of an anion X in an aqueous solution which anion is capable for forming an inorganic ester of the formula R–X which can be hydrolyzed to a photometrically determinable hydrolysis product R–OH, the apparatus comprising in combination:
a. means for receiving an aqueous solution, determining its optical density, and discharging the solution;
b. a container containing a composite consisting essentially of an insolubilized esterase which can hydrolyze the ester R–X; said container adapted to receive a discharged solution from (a) and adapted to permit intimate contact of said discharged solution with the composite;
c. means for discharging the solution from the container of (b); and
d. means for determining the optical density of the discharged solution.

25. The apparatus, as claimed in claim 24 wherein the insolubilized esterase comprises an esterase bonded to a porous glass carrier.

* * * * *